Aug. 22, 1939.   C. R. BUSCH   2,170,119
CAR TRUCK SIDE FRAME
Filed Aug. 7, 1937   2 Sheets-Sheet 1
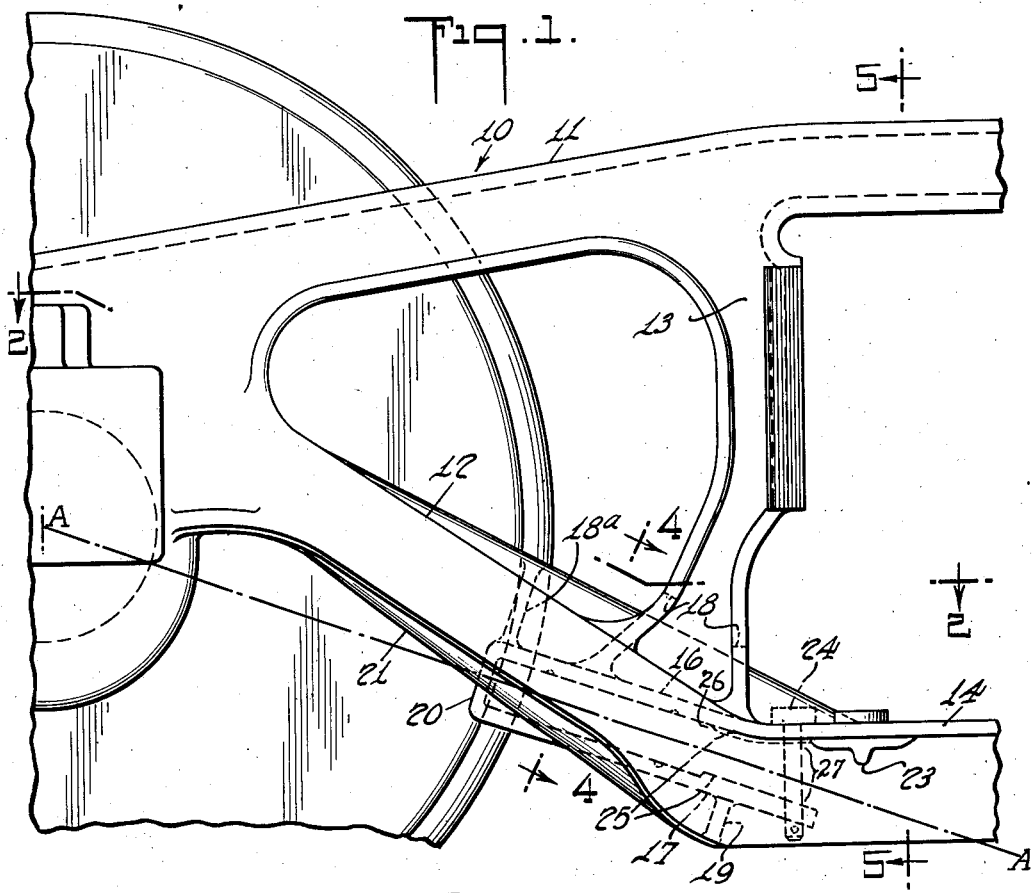
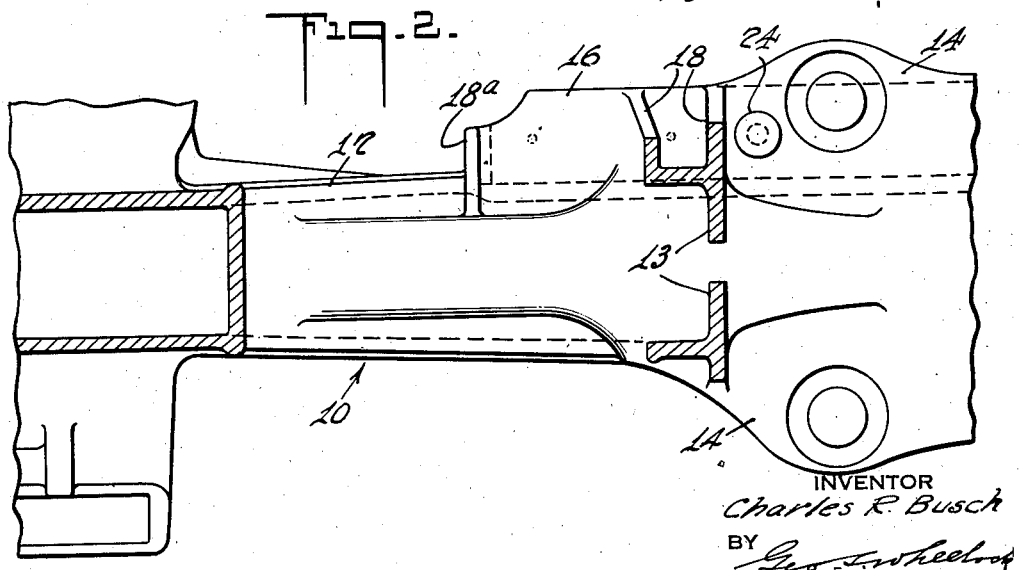
INVENTOR
Charles R. Busch
BY
ATTORNEY

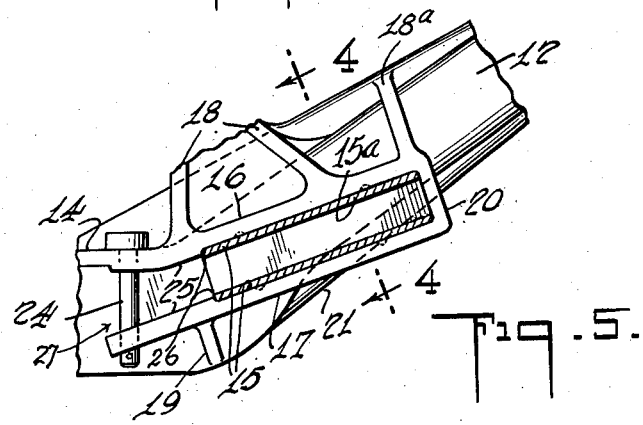
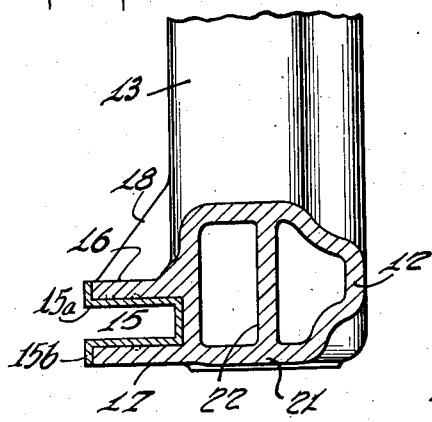
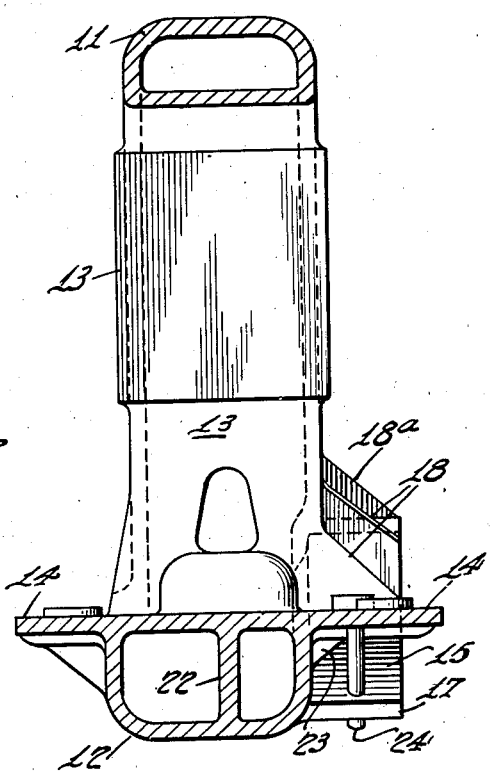

Patented Aug. 22, 1939

2,170,119

UNITED STATES PATENT OFFICE 2,170,119

CAR TRUCK SIDE FRAME

Charles R. Busch, Orange, N. J., assignor to Buffalo Brake Beam Company, New York, N. Y., a corporation of New York Application August 7, 1937, Serial No. 157,864

19 Claims. (Cl. 188—212)

The present invention relates to car truck side frames of the character of construction disclosed in my previous application Serial No. 130,881, filed March 15, 1937. As does said previous application, the present invention comprises means adapted for supporting and guiding a brake beam upon the side frames of a car truck, although the invention disclosed is of broader range, covering a reinforced and strong side frame whether or not a breake beam is guided thereupon.

One of the objects of the present invention is to provide means for supporting and guiding a brake beam upon a car truck side frame so that the beam may be engaged with and removed from a car truck without disturbing the side frames thereof, to which end the beam may be engaged with and removed from the side frames at points below the spring seats.

A further object is to provide the lower ends of the guides with movable stops, gates or the like for confining the brake beam in its movement during braking action and to permit the beam to be dropped to the track when the stops, gates or the like are moved out of the way.

Other objects are to specially reinforce the side frame, more particularly the tension member thereof, so as to increase the life of side frames and overcome breakages thereof, thereby reducing the number of possible accidents.

These being among the objects of the present invention, the same consists of certain features of construction and combinations of parts to be hereinafter described and then claimed with reference to the accompanying drawings illustrating an embodiment of the invention and wherein Fig. 1 is a side elevation of a car truck side frame showing substantially one-half thereof as the other half would be of the same construction, and parts being indicated in broken lines;

Fig. 2 is a section on the line 2—2, Fig. 1, looking downwardly in the direction of the arrows;

Fig. 3 is an elevation of a portion of the side frame looking towards the inner side thereof;

Fig. 4 is a transverse section of Fig. 3 on line 4—4, looking in the direction of the arrows, and Fig. 5 is a vertical section on the line 5—5, Fig. 1, looking in the direction of the arrows.

The side frame 10 is preferably of truss construction and made in a single casting of malleable steel, comprising a compression member 11 and a tension member 12. Connecting the two members 11, 12 there is a bolster guiding column 13 which is constructed in a strong and substantial way as will appear; and of course such a column and a corresponding column (not shown) provide a window opening wherein a bolster may move up and down. The spring seat 14 preferably projects beyond opposite sides of the tension member 12, that is, inwardly and outwardly.

Preferably the side frame is provided with means for supporting and guiding a brake beam in a recess 15 as in my aforesaid application. Whether such a guiding recess is provided or not by ribs or flanges 16, 17 for guiding a brake beam, such ribs strengthen and reinforce the side frame in the region of the intersection of the tension member and guiding column 13, as merely to attain that particular object the brake beam may be otherwise supported as by the usual types of swinging brake beam hangers. These ribs 16, 17 extend inwardly along the inner side of the tension member toward the center of the side frame in spacial relation so as to provide the recess 15 between them. The upper rib or flange 16 is formed as a direct continuation of the inwardly projecting portion of the spring seat 14 so that these two elements mutually contribute to the strengthening of the tension member, the one merging into the other. The lower rib or flange 17 terminates at its inward end preferably directly under the spring seat 14, and hence such end is located at a spaced distance away from and under said seat.

The preferred angle at which the ribs or flanges 16, 17 extend along the tension member 12 is shown by the broken line A—A, in Fig. 1, such line indicating the preferred direction of travel of the brake beam in applying and releasing braking pressure. Such line A—A is shown as inclined at an angle of twenty degrees with respect to the horizontal, and intersects the axis of the car wheels supported at that end of the side frames so that the brake beam may be caused to travel towards the said axis in applying the braking pressure. It will be seen that the line of travel of the brake beam as indicated by the line A—A passes below the spring seat at both ends of the side frame. A pair of reinforcing brackets or ribs 18 are cast integrally with the side frame and extend downwardly along the inner side of column 13 to the upper rib or flange 16. Preferably a third reinforcing bracket or rib 18a, corresponding with the one 18, extends from the outer upper end of the rib or flange 16 transversely upwardly on the tension member 12. Preferably also a bracket-like reinforcing rib 19 extends downwardly from the lower end portion of the rib 17 to the bottom edge of the tension member 12.

Preferably the outward upper ends of the ribs 16, 17 are connected by a transverse wall or closure 20 formed also integrally with the ribs 16, 17 and the side frame, the elements 16, 17 and 20 providing means for confining the end of a brake beam on three sides, in case the beam is to be guided upon the side frame. As in my aforesaid application the tension member 12 is preferably provided with a relatively narrow bottom reinforcing portion 21 extending under the window opening of the side frame. And also as therein disclosed the hollow tension member is reinforced by a vertical interior web 22 as in Fig. 4 herein, but in the present case this web extends not only within the upwardly inclined portion of the tension member, but along the deepest part thereof, underneath the window opening, as shown in Fig. 5. A reinforcing bracket 23, as shown in Fig. 5, preferably extends down from the spring seat 14 along the corresponding inner side wall of the tension member 12.

A pin or gate 24 is located at the lower inner ends of the ribs or flanges 16, 17, and the same preferably passes downwardly through the inwardly projecting portion of the spring seat 14 and through the lower end of the rib 17 which is beneath the spring seat. Such pin or gate 24 is removable at will and when in position, as shown in Fig. 1, acts as a stop to prevent the dislodgement of the brake beam and the falling thereof on the track. This stop 24 when in the form of a pin may have the head thereof resting upon the spring seat and have a cotter pass through the end thereof which projects beneath the rib 17.

It is to be distinctly understood that where the claims herein characterize the stop as movable, that it is the intention thereby to include a stop whether it is entirely removable from the side frame, as is the disclosed pin or gate 24, or is just sufficiently movable to merely open up the mouth of the guiding groove or means so that the end of a brake beam may be disengaged, or sufficiently movable to interrupt and interfere with the disengagement of the beam. It is obvious that if the gate or pin 24 is raised, it does not have to be removed from the upper hole in the spring seat in which it is inserted, in order to perform its necessary functions with respect to the end of the brake beam.

Preferably, as shown in Figs. 3 and 4 the recess 15 defined by the ribs 16, 17 is lined by a wear sheet or plate 15a, 15b of hardened steel as in my aforesaid application, and to prevent the same, when inserted in the recess, from sliding in the direction of the inner ends of the ribs 16, 17, the latter are provided with thickened portions 25 at their corresponding inner surfaces, which results in inward shoulders 26 with which the lower end of such a lining will be engaged so as to prevent the same from sliding down longitudinally.

When a brake beam is to be confined in its travel upon the side frames of a car truck it will be seen that each side frame will serve to confine the beam on four sides, or rather all around the guided end thereof, that being obtained by the ribs 16, 17, end wall 20 and stop or gate 24, the latter however being a movable element which although it intercepts the mouth 27 at the lower end of the recess between the flanges 16, 17, it can be removed whenever desired. Should it be desired at any time when convenient to remove the stop or gate 24, the same can be done, and if the brake beam is disconnected from the brake mechanism, it may be allowed to fall through the mouth 27 and onto the track. When repairs have been made or a new beam is to be used, the beam can be replaced readily by passing its ends into the mouths, such as 27, at the bottom of the side frames and then be moved up to proper position for travel upon the guide ribs 16, 17, the stops or gates 24 being then reapplied to the side frames so as to prevent the brake beam from falling to the track. It will readily be seen that the brake beam with the brake heads mounted thereon can be removed when dismounting the brake heads therefrom. This also facilitates repair and replacements.

It will be obvious to those skilled in the art that desirable changes and modifications of the invention may be resorted to without departing from the scope of the appended claims.

What I claim as new is:

1. A car truck side frame having a spring seat, and including means thereon for supporting and guiding a brake beam upon the side frame, such means extending inwardly towards the center of the side frame along a line which passes beneath the entire spring seat and there terminating to permit the downward removal of the beam.

2. A car truck side frame having a spring seat, and including means thereon for supporting and guiding a brake beam upon the side frame, the longitudinal axis of such means extending inwardly towards the center of the side frame along a line which passes beneath the spring seat, and such means having a stop at its inner end to prevent removal of the beam, and movable at will when desired to permit removal of the beam.

3. A car truck side frame having a spring seat, and including means thereon for supporting and guiding a brake beam upon the side frame, the longitudinal axis of such means extending inwardly towards the center of the side frame on a line which passes beneath the spring seat and on a downward angle of inclination so that the line of movement of the beam intersects the car wheel axis.

4. A car truck side frame having a spring seat, and including a brake beam supporting and guiding rib or flange thereon, extending inwardly towards the center of the side frame along a line passing beneath the entire spring seat.

5. A car truck side frame having a spring seat, and including a brake beam supporting and guiding rib or flange thereon, extending inwardly towards the center of the side frame along a line passing beneath the spring seat, and a beam limiting stop located at the inward end of the rib and movable at will when desired to permit removal of the beam.

6. A car truck side frame having a spring seat, and including a brake beam supporting and guiding rib or flange thereon and extending inwardly towards the center of the side frame along a line passing beneath the spring seat and stop means associated with the rib, for limiting the inward movement of the beam upon the rib, the stop being movable at will when desired.

7. A car truck side frame having a spring seat, and including a brake beam supporting and guiding rib or flange thereon and extending inwardly towards the center of the side frame along a line passing beneath the spring seat, and a stop engaged with the spring seat and the inward end of the rib, the stop being movable at will when desired.

8. A car truck side frame having a spring seat, and including a brake beam supporting and guiding rib or flange thereon and extending inwardly towards the center of the side frame along a line passing beneath the spring seat, and a stop upon and projecting downwardly from the spring seat, for limiting the inward movement of the beam upon the rib, the stop being movable at will when desired.

9. A car truck side frame having a tension member, and including a brake beam supporting and guiding rib or flange on the tension member, extending at an inclination downwardly to a point between the top and bottom of the extreme lower portion of such member, which portion is below the bolster window opening, and the rib continued as far as such point.

10. A car truck side frame having a tension member, and including a brake beam supporting and guiding rib or flange on the tension member, extending at an inclination downwardly to a point between the top and bottom of the lower portion of such member, which portion is below the bolster window opening, and the rib continued as far as such point, the angle of inclination being parallel with a line which extends upwardly from said portion and intersects the axis of the car-wheel.

11. A car truck side frame having a spring seat, and including a brake beam guiding rib thereon which extends to and merges with the spring seat at an upward angle of inclination with respect to the seat and as a continuation thereof, and means below the rib and seat allowing access to the beam to remove it.

12. A car truck side frame having a spring seat projecting inwardly thereof, and including a brake beam guiding rib on the inner side of the frame, extending therealong as a substantial continuation of the inward projection of the spring seat, the length of the rib being at least sufficient to guide the beam in its movement in applying and releasing the brake.

13. A car truck side frame having a tension member with a spring seat, and including a pair of ribs on such member for guiding a brake beam there-between, such ribs extending inwardly along the tension member at an angle which passes below the spring seat.

14. A car truck side frame, including means for confining one end of a brake beam during brake application, such means supporting and guiding the beam along the frame towards the center thereof, the inner portion of such confining means retaining the beam therein and being movable to permit lateral insertion of such end of the beam onto the confining means and the lateral separation of such end therefrom.

15. A car truck side frame, including a pair of ribs thereon for guiding a brake beam therebetween, and reinforcing the frame, such ribs extending inwardly along the frame towards the center thereof and having movable stop means for interrupting or opening up the space between them.

16. A car truck side frame, including a pair of ribs thereon for guiding a brake beam there-between, such ribs extending inwardly and downwardly at an inclination along the frame towards the center thereof and having movable stop means at their lower inner ends for interrupting or opening up the space between them.

17. A car truck side frame having a spring seat, and including a pair of ribs extending inwardly along the side frame at a downward inclination, and spaced apart for receiving a brake beam between them, the upper rib merging with the spring seat as a continuation thereof.

18. A car truck side frame having a spring seat, and including a pair of ribs extending inwardly along the side frame at a downward inclination towards the center thereof, and spaced apart for receiving a brake beam between them, the upper rib merging with the spring seat as a continuation thereof, and movable stop means interrupting or opening up the space between the ribs.

19. A car truck side frame having a tension member, including a downwardly and inwardly inclined guide for receiving and guiding the end of a brake beam within it, the lower portion of the guide having a mouth through which said end may be laterally introduced or removed, and means at the mouth and operable at will for preventing the beam from sliding out of the guide in a direction towards the center of the tension member.

CHARLES R. BUSCH.